Oct. 2, 1923. 1,469,438
J. F. GILL ET AL
ELECTRICAL APPARATUS FOR THE LOCAL AND DISTANT REPETITION OF MOVEMENTS
Filed March 1, 1920 7 Sheets-Sheet 1

Inventors
J. F. Gill
J. N. Chaviara
By H. R. Kerslake
Attorney

Oct. 2, 1923.

J. F. GILL ET AL 1,469,438

ELECTRICAL APPARATUS FOR THE LOCAL AND DISTANT REPETITION OF MOVEMENTS

Filed March 1, 1920 7 Sheets-Sheet 3

Inventors
J. F. Gill
J. N. Chaviara
By H. R. Kerslake
Attorney

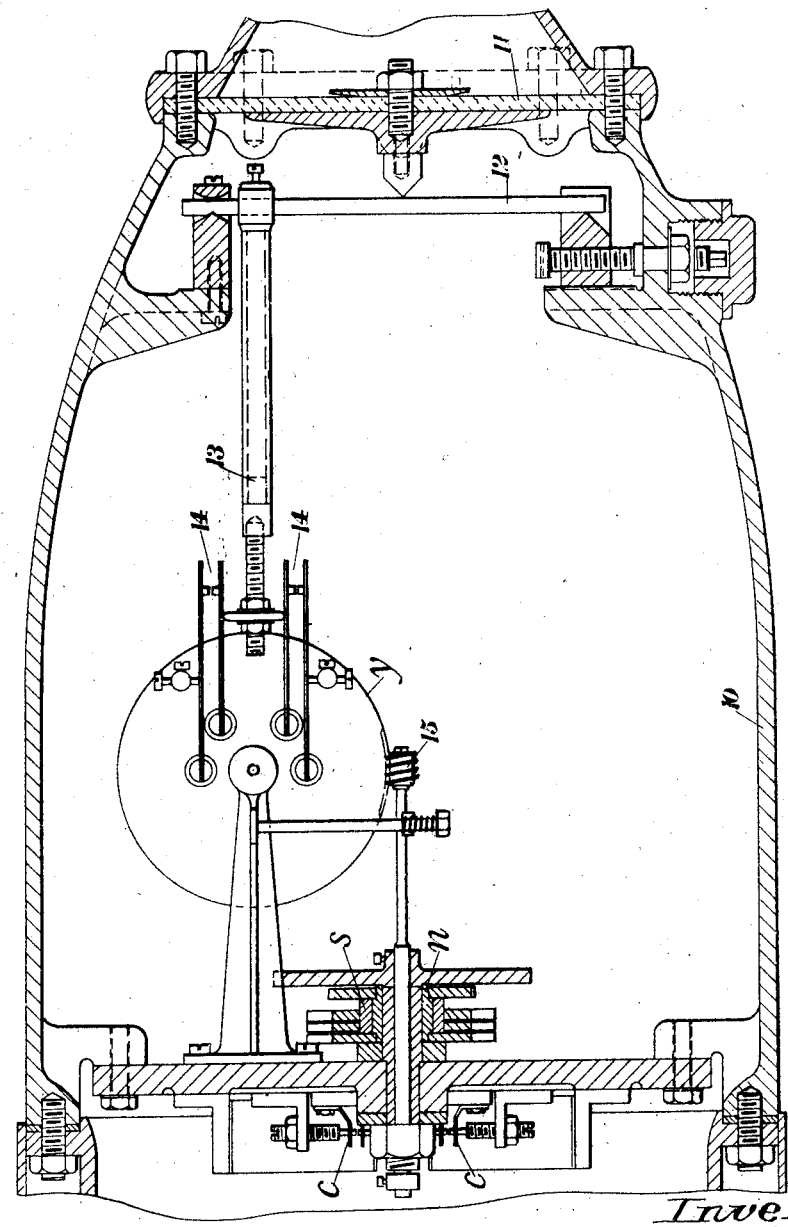

Patented Oct. 2, 1923.

1,469,438

UNITED STATES PATENT OFFICE.

JAMES FRANCIS GILL AND JOHN NICHOLAS CHAVIARA, OF LIVERPOOL, ENGLAND.

ELECTRICAL APPARATUS FOR THE LOCAL AND DISTANT REPETITION OF MOVEMENTS.

Application filed March 1, 1920. Serial No. 362,490.

*To all whom it may concern:*

Be it known that we, JAMES FRANCIS GILL and JOHN NICHOLAS CHAVIARA, subjects of the King of Great Britain and Ireland, residing at 25 Castle Street, Liverpool, England, have invented certain new and useful Improvements Relating to Electrical Apparatus for the Local and Distant Repetition of Movements, of which the following is a specification.

This invention relates to mechanisms of the type in which transmitting and receiving mechanisms each fitted with an electromagnetically operated stepping device are employed, the stepping device of either mechanism being arranged to control the operation of the other mechanism.

Referring to the accompanying drawings:—

Figure 8 is a sectional plan showing an application of the invention to the transmitting mechanism of an automatic water sounding apparatus or tide indicator.

Referring to Figures 1-5, the transmitting mechanism there shown contains two independent (and preferably counterbalanced) stepping devices adapted to produce opposite rotations of an index. Each stepping device $a$ is pivoted at one end and provided at the other end with end pieces $b$ arranged to coact with fixed contact pieces $c$. The stepping device may be held in each limit of its movement by blade springs $d$ and is actuated against the spring resistances by electro-magnets $e$, pole pieces $f$ being carried on the stepping device for cooperation with the iron cores of the magnets. Each stepping device is adapted to close a circuit connected to a point between the magnets of the complementary instrument (in this case the receiver) and the contacts $c$ are respectively connected to the opposite ends of the magnets as fully set forth in British Patent 123,830 of June 28, 1920. The arbor $g$ of the stepping device is provided with an escapement pawl or anchor $h$ which can intermittently rotate in one direction an escapement wheel $i$ to the spindle of which is secured a pinion $j$ and also a non-return ratchet $k$ engaged by spring controlled pawls $l$.

On a spindle $m$ is freely rotatable a bush $n$ to which is secured a pair of pinions $o$ $p$, the latter of which engages the pinion $j$ of the upper escapement mechanism, whilst the former engages a planet pinion $q$ on a contact carrier $r$. The said carrier is also rotatable freely on the spindle $m$. Surrounding the bush $n$ is another and relatively rotatable bush $s$ also provided with a pair of pinions $t$, $u$, the former of which engages another planet pinion $v$ meshing with the pinion $q$ whilst the latter engages the pinion $j$ of the lower escapement mechanism. This mechanism forms an epicyclic system by which rotary movement can be imparted to the contact carrier $r$ in one direction by the upper escapement mechanism, and in the opposite direction by the lower escapement mechanism. It will be understood that while one of the escapement mechanisms is in operation the other is stationary.

Figure 5:
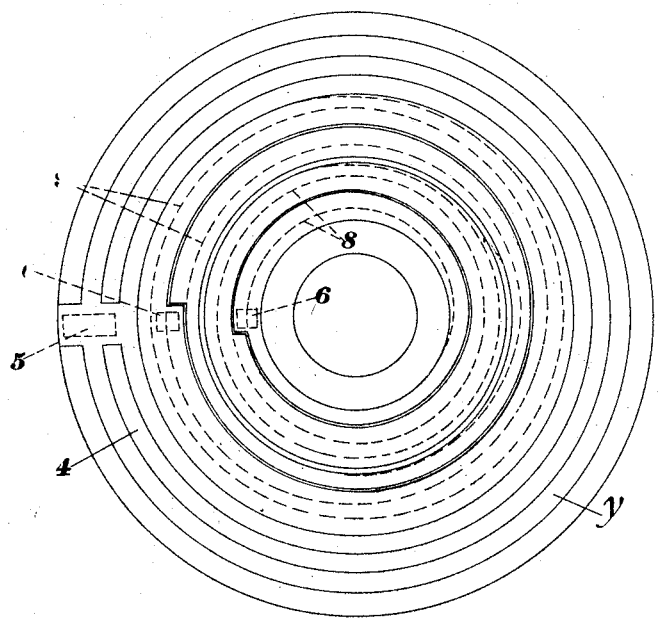
Figure 4:
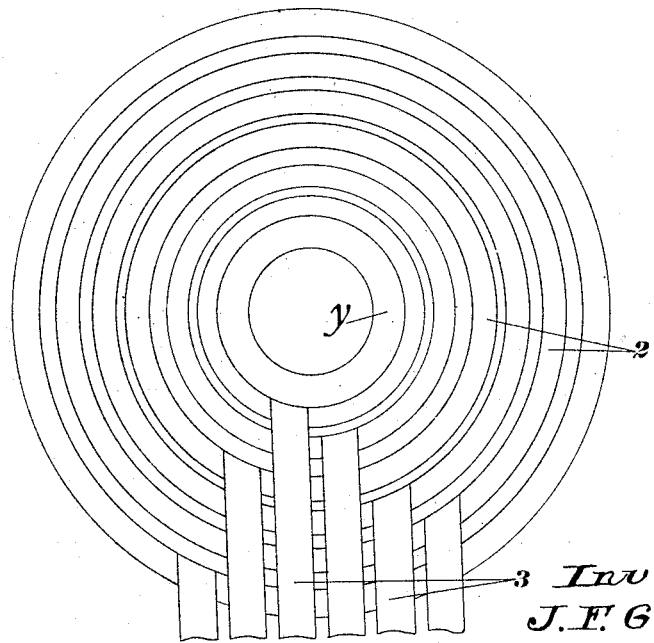
Figure 4 is a rear elevation, and Figure 5 a front elevation of the circuit controlling device.

To the contact carrier is attached an index $w$ movable over a dial $x$. The spindle $m$ has secured to it a contact disc $y$ of insulating material, and another index $z$, the spindle being rotatable by hand. On both sides of the disc $y$ are arranged concentric metal contact rings. In the arrangement shown there are six rings on each side. The rings 2 on the rear side are continuous and act in conjunction with fixed brushes 3 (Figure 4). On the front side the rings are of special construction. The two outer ones 4 are gapped in one position and the spaces between their adjacent ends are occupied by the insulating material of the disc. These two can be connected by a brush 5 mounted on the carrier $r$. The other four are each made to a serrated scroll form. These four form two pairs all of which are insulated from each other, and each pair is constructed with ends which overlap without touching as shown in Figure 5. In conjunction with each pair is arranged a V-shaped or knife-edge contact piece (6, 6',) carried on a spring blade 7 which has a pivotal connection with the carrier $r$. When the brush 5 (indicated by dotted lines Figure 5) rests on the insulated portion between the ends of the rings 4 the battery circuit is open and the contacts 6, 6', then occupy relative positions which are also indicated by dotted lines in Figure 5. Rotation of the disc $y$ in the clockwise direction causes the contact 6 to connect the pair of rings 8. Meanwhile the contact 6' remains on the outer ring of the pair 9, and is inoperative. Rotation in the anticlockwise direction causes the contact 6' to join the rings 9, whilst the contact 6 remains inoperative on the inner ring of the pair 8. The construction of the scrolls is such that either contact 6, 6', can be either operative or inoperative through a range of movement of the disc of about 270°. Each ring on one face of the disc is electrically connected by a peg $y^2$ passing through the disc to the ring immediately opposite on the other side of the disc.

Starting from the position shown, rotation of the disc in the clockwise direction, closes the battery circuit through the medium of the outer front rings 4, contact 5 and the corresponding rings and fixed contacts at the back of the disc. At the same time the inner pair of scrolls are connected by the contact 6, thus rendering operative through the corresponding rear rings and contacts the particular stepping system of the transmitting and receiving instruments which is controlled by those connections. While the other stepping system remains inactive, the system brought into operation produces motion of the contact carrier $r$ and index $w$ in the same direction as that in which the disc was moved. When the contact 5 reaches the gap in the rings 4 the battery circuit is opened and the action of the instrument ceases. The movement imparted to the carrier is always equal to that imparted to the disc by the handle, and the index $w$ comes to rest behind the index $z$. If due to any defect in the mechanisms the index $w$ does not coincide with the index $z$ when at rest, an indication of defective action is thereby given to the operator. Reverse movement of the disc causes the battery circuit to be again closed by the contact 5 on the rings 4, but now the contact 6' comes into operation and puts into action the other stepping system of the instruments, causing the carrier $r$ and the index $w$ to move in the reverse direction until the motion is again arrested by coincidence of the contact 5 with the insulated gap in the rings 4.

Figure 6:
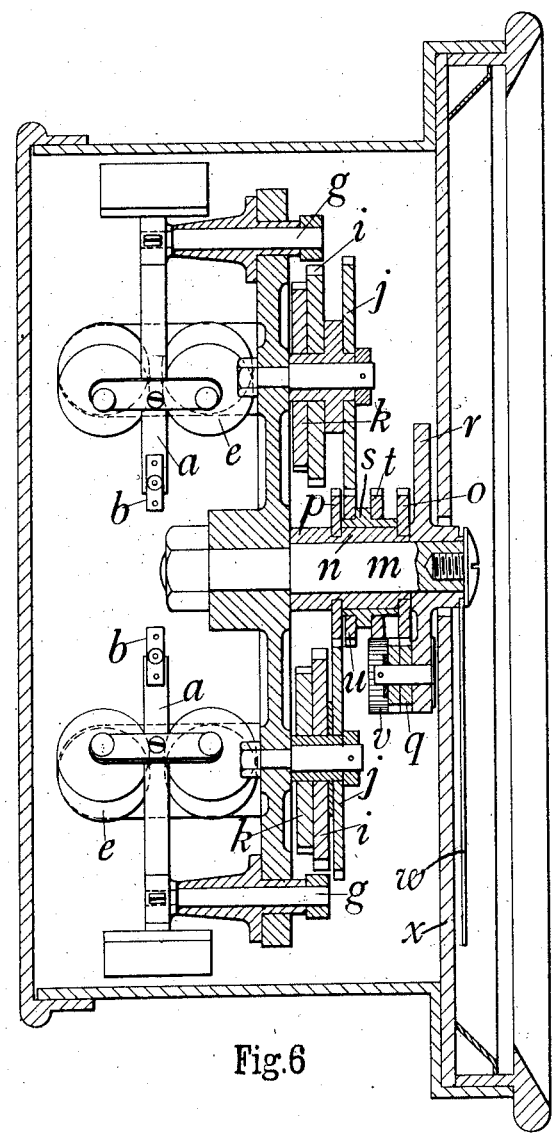
Figure 6 is a longitudinal section of the receiving instrument.

The receiving mechanism as shown in Fig. 6 is essentially the same as the transmitting mechanism, excepting that it is provided with but one index and does not contain a contact device for automatically arresting the motion of the stepping devices, this being unnecessary as the receiving mechanism is controlled by the transmitting mechanism. The connections between the stepping devices and magnets of the transmitting and receiving mechanisms are shown together with the internal connections of each instrument and the battery connections in Figure 7. In Figure 6 the reference letters have the same significance as in Figures 1-3.

Figure 7:
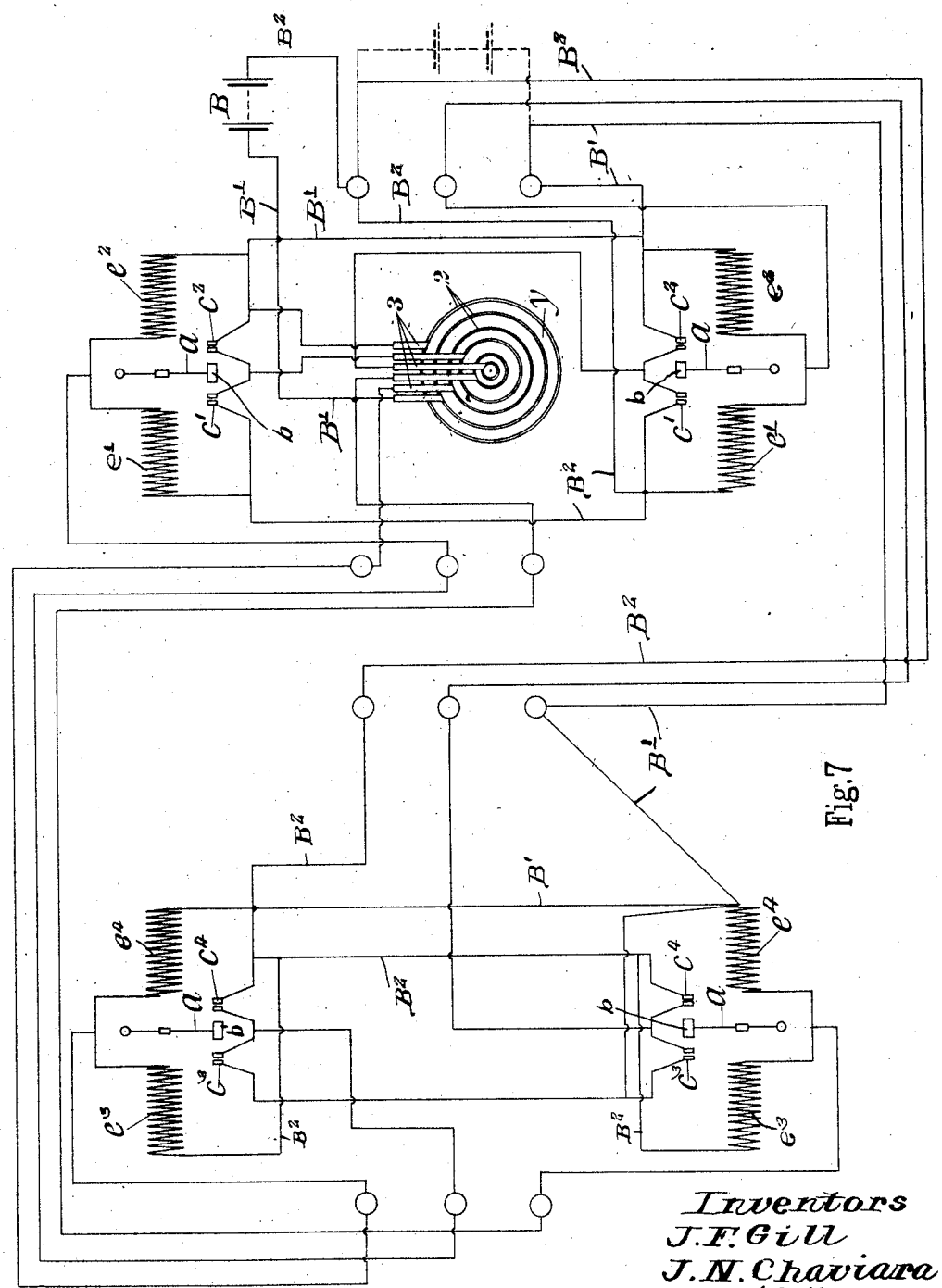
Figure 7 is a diagram showing the wiring connections of the two instruments.

When it is deemed inadvisable to break the battery circuit for stopping the apparatus the battery may be connected as shown by dotted lines in Figure 7. In this case the battery current is always on and the stopping and starting of the apparatus is controlled by the contacts 6, 6' on the scrolls 8.9. The rings 4 and their associated contacts may then be dispensed with.

Figure 1:
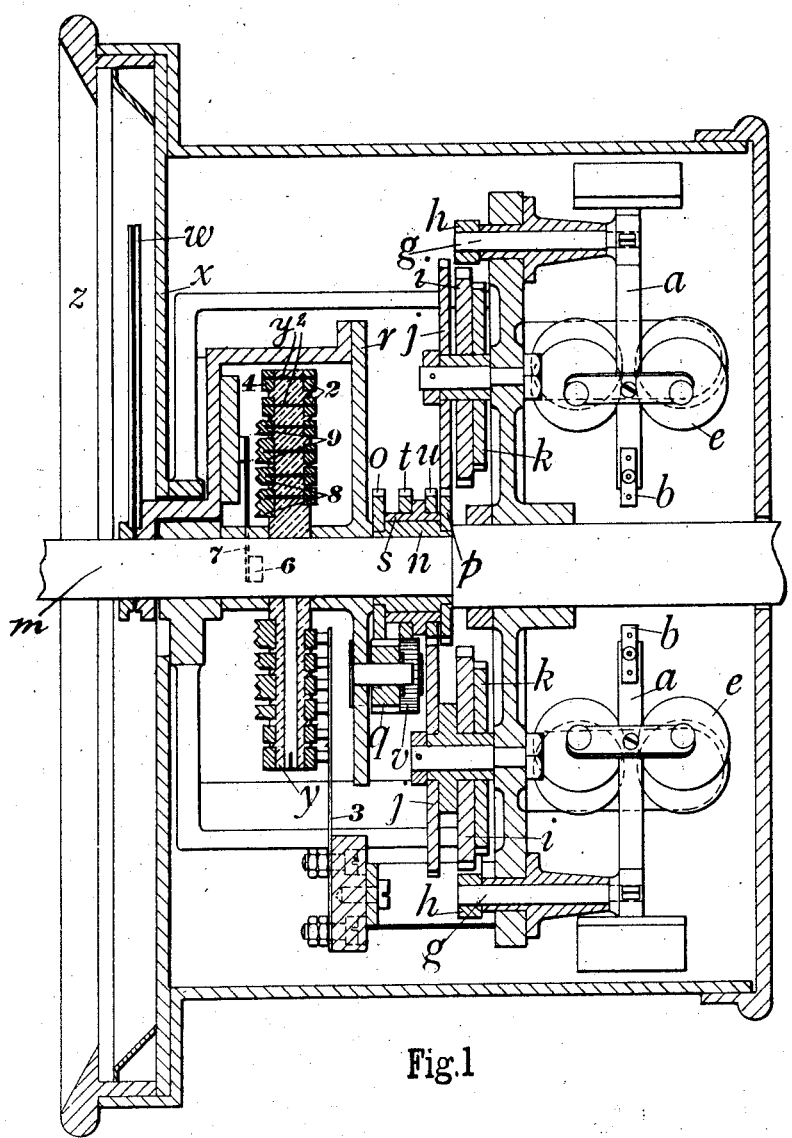
Figure 1 is a longitudinal section of the transmitting mechanism of a telegraph constructed in accordance with this invention for use in navigational, electric power station and other purposes.
Figure 2:
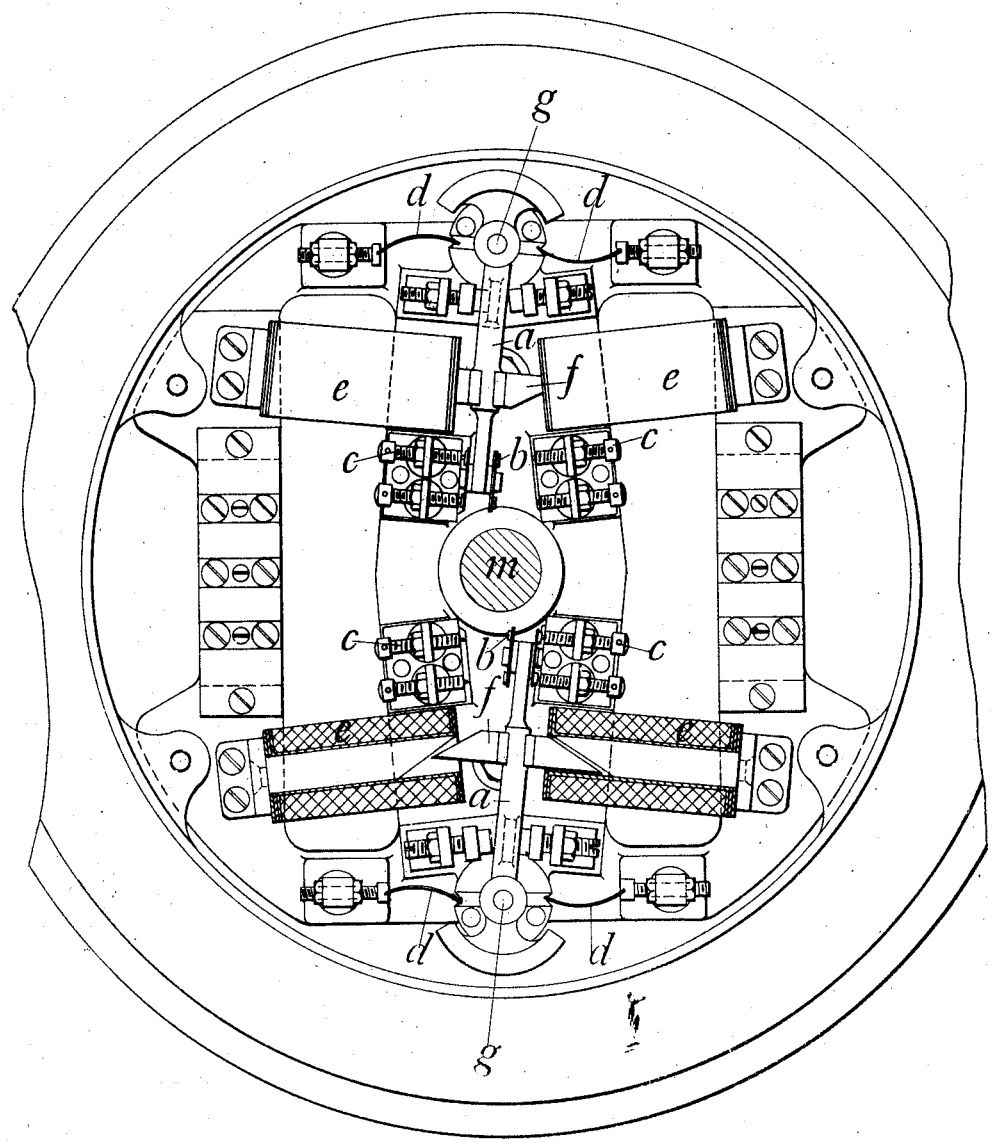
Figure 2 is a rear elevation with the cover removed.
Figure 3:
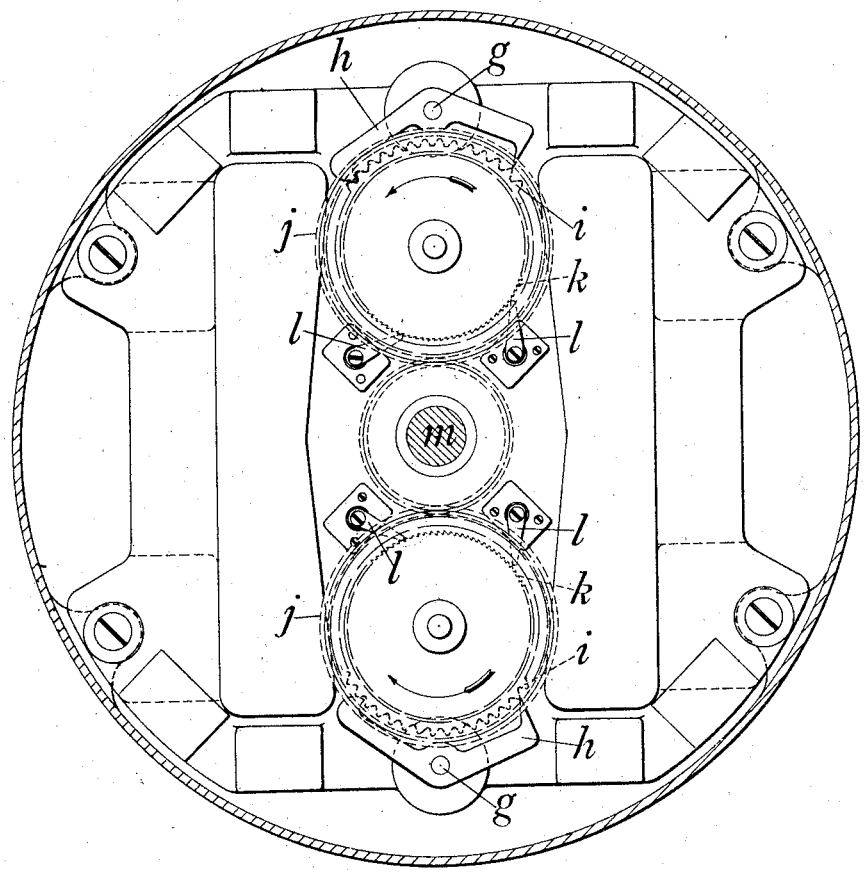
Figure 3 is a front elevation of the escapement mechanism.

For convenience of reference, the coils of the electro-magnets, which, in Figs. 1 and 2, are designated $e$, in Fig. 7 are designated $e'$, $e^2$, $e^3$, and $e^4$. while in the last mentioned figure, the contact pieces designated $c'$, $c^2$, $c^3$ and $c^4$ are the same as those designated at $c$ in Fig. 2.

To follow the circuits shown in Fig. 7, it is necessary to consider only the upper coils and contacts of each instrument. Starting from the left hand side of the battery B and following the line B', through the two outer rings of the disc $y$, it will be found that the left end of the battery is connected to the right end of each of the coils $e^2$, and $e^4$. Starting from the right side of the battery B and following the conductors marked $B^2$, it will be found that the right side of the battery is connected to the left hand end of each of the coils $e'$ and $e^3$. When the instruments are at rest the stepping device will lie either to one side or the other of the center position and the adjacent contact will consequently be closed. Supposing $c^2$ to be closed in the one instrument and $c^4$ in the other, then $c^2$ will short circuit $e^4$ and $c^4$ will short circuit $e'$. In other words, there will be two closed circuits in parallel in the instrument one including $e^3$ and $c^2$ and the other including $c^4$ and $e^2$. The circuit which contains $e^3$ and $c^2$ passes through the middle pair of rings 2 on the disc $y$.

Coils $e^2$ and $e^3$ are excited, and while the effect of $c^2$ is to pull the adjacent stepping device $a$ toward the closed contacts $c^2$, the effect of $e^3$ is to pull the adjacent stepping device off the contacts $c^4$ into the contacts $c^3$, the intermittent or alternate action of the stepping devices proceeding in this manner, as fully set forth in British Patent 123,830, mentioned above.

When the movements to be given to the contact device in the transmitting instrument are necessarily small a modified form of contact device is used. For example our invention may be employed for indicating or recording depth of water in a particular position, the contact device being actuated by a flexible diaphragm through the medium of a lever. Referring to the transmitting mechanism of the sounding apparatus or tide indicator shown in Figure 8, a closed chamber 10 containing the transmitting mechanism is fitted with a flexible rubber or other diaphragm 11 which is exposed on one side to the water. On the other side the diaphragm acts on a flexible cross bar 12 to which is secured a lever 13 which receives an angular movement when the bar 12 is deflected incident to pressure exerted upon the diaphragm 11. At its outer end the lever lies between two pairs of spring contact blades 14 carried on a rotatable disc $y$. The latter is rotatable through worm gearing 15 from epicyclic gearing actuated by one of a pair of stepping devices carried on a plate 16 in the chamber. The mechanism for actuating the worm gearing is essentially the same as that shown in Figures 1-5 and will be readily identified in the drawing.
When used for sounding purposes the chamber 10 is lowered into the water, and when used as a tide indicator the chamber is secured in a pre-determined submerged position. Due to the pressure of the water the diaphragm is deflected inwards by an amount proportional to the pressure, and by means of the lever the upper spring contacts are pressed together thereby closing an electric circuit and setting one of the transmitter and receiver oscillators in motion. By this motion of the transmitter oscillator the disc $y$ is caused to rotate in the direction for restoring the original condition of the said contacts, and the amount of movement required to effect this condition is indicated in the receiving instrument which is fixed on ship board or on land in any desired position. The receiver movement is calibrated to indicate depth of water at the position of the chamber containing the transmitting mechanism. When the depth of water is diminished an opposite movement is given to the lever which now closes the lower pair of contacts and by thus bringing the other oscillators into action the disc $y$ is moved in the reverse direction by an amount equal to the movement of the lever.

The apparatus comprising transmitting and receiving mechanisms are applicable with appropriate modification to a wide variety of uses.

Having thus described our invention what we claim as new and desire to secure by Letters Patent is:—

1. In combination, electrical transmitting and receiving mechanisms, a pair of electromagnetically actuated stepping devices in each mechanism, an electric circuit including said stepping devices, a movable circuit controlling device interposed in said circuit and associated with said stepping devices, said circuit controlling device being movable by externally operated means and by the transmitter stepping devices, an index in the receiving mechanism movable by the stepping devices in said mechanism, epicyclic mechanism whereby motion is imparted in each direction from the stepping devices to the index of the receiving mechanism and from the stepping devices to the circuit controlling device in the transmitting mechanism.

2. In combination, electrical transmitting and receiving mechanisms, a pair of electromagnetically actuated stepping devices in both the transmitting and receiving mechanisms, an index movable in opposite directions by the stepping device in each mechanism, an electrical circuit including said electro-magnetically actuated stepping devices, a rotatable circuit controlling device located in the transmitting mechanism, said circuit controlling device being movable by externally operated means and by the stepping devices of the transmitter mechanism, an additional index in the transmitting mechanism movable in conjunction with the said externally operated means of the circuit controlling device, epicyclic mechanism whereby motion is imparted in either direction from the stepping devices to the index of the receiving mechanism, and from the stepping devices to one of the indexes and the circuit controlling device of the transmitting mechanism.

3. In combination, electrical transmitting and receiving mechanisms each mechanism comprising a pair of stepping devices, an escapement pawl on each stepping device, an escapement wheel in conjunction with each escapement pawl, a ratchet wheel coaxial with each escapement wheel, a pawl engaging said ratchet wheel, a pinion also coaxial with the escapement and ratchet wheel, said wheels being secured together, two coaxial and relatively movable sets of sun pinions respectively engaged by the stepping device operated wheels, planet pinions engaging and actuated by the sun pinions, a carrier for the planet pinions, an index attachment to said carrier in both mechanisms, electrical contacts forming part of a circuit controlling device in the transmitting mechanism and actuated by the planet pinion carrier of that mechanism, and a disc carrying electrical contacts coacting with the aforementioned contacts and movable by externally operated means, substantially as described.

In testimony whereof we have signed our names to this specification.

JAMES FRANCIS GILL.
JOHN NICHOLAS CHAVIARA.